United States Patent [19]

Oberg et al.

[11] 4,369,915

[45] Jan. 25, 1983

[54] METHOD AND APPARATUS FOR REGULATING THE DIFFERENTIAL RPM OF TWO ROTATING PARTS

[75] Inventors: Hans-Joachim Oberg, Roesrath; Wolf-Diethard Gruenberg; Guenther Posse, both of Bergisch-Gladbach, all of Fed. Rep. of Germany

[73] Assignee: Klöckner-Humboldt-Deutz AG, Fed. Rep. of Germany

[21] Appl. No.: 234,382

[22] Filed: Feb. 13, 1981

[30] Foreign Application Priority Data

Feb. 15, 1980 [DE] Fed. Rep. of Germany ....... 3005658

[51] Int. Cl.³ .............................................. B04B 9/02
[52] U.S. Cl. .......................................... 494/8; 494/9; 494/37; 494/53
[58] Field of Search .................... 233/23 R, 7, 24, 1 R; 318/12, 13, 15, 318, 319, 327, 341

[56] References Cited

U.S. PATENT DOCUMENTS

| | | | |
|---|---|---|---|
| 3,206,665 | 10/1965 | Burlingham | 318/327 |
| 3,734,399 | 5/1973 | Oas | 233/7 |
| 3,780,365 | 12/1973 | Porter et al. | 318/318 |
| 4,085,888 | 4/1978 | Jäger | 233/19 X |
| 4,240,578 | 12/1980 | Jackson | 233/7 |
| 4,299,353 | 11/1981 | Bruning et al. | 233/7 |

FOREIGN PATENT DOCUMENTS

| | | | |
|---|---|---|---|
| 2432284 | 2/1975 | Fed. Rep. of Germany | 233/7 |
| 2512213 | 10/1976 | Fed. Rep. of Germany | 318/12 |
| 2525280 | 12/1976 | Fed. Rep. of Germany | 233/7 |
| 2819399 | 11/1978 | Fed. Rep. of Germany | 233/7 |
| 634237 | 11/1978 | U.S.S.R. | 318/341 |

*Primary Examiner*—Harvey C. Hornsby
*Assistant Examiner*—Christine A. Peterson
*Attorney, Agent, or Firm*—Hill, Van Santen, Steadman, Chiara & Simpson

[57] ABSTRACT

A method and apparatus for regulating the differential rpm of two rotating parts, such as the external drum and internal worm conveyor of a worm centrifuge, undertakes an electronic measurement and sampling of the rotational during the course of operation of a particular device under speeds of each part and supplies this information to a microprocessor which calculates the respective rotational speeds of the parts and relays a signal to the drive device for one of the parts in order to maintain a preselected rpm differential between the rotational speeds of the two parts. Different characteristic curves are stored in the microprocessor for optimum rpm differential during the course of operation of a particular device under different conditions, such as for different sludge consistencies in the case of use with a centrifuge. If deviation of the actual rotational speed of one of the parts from the optimum value is detected, the microprocessor operates to return operation to the optimum values.

9 Claims, 1 Drawing Figure

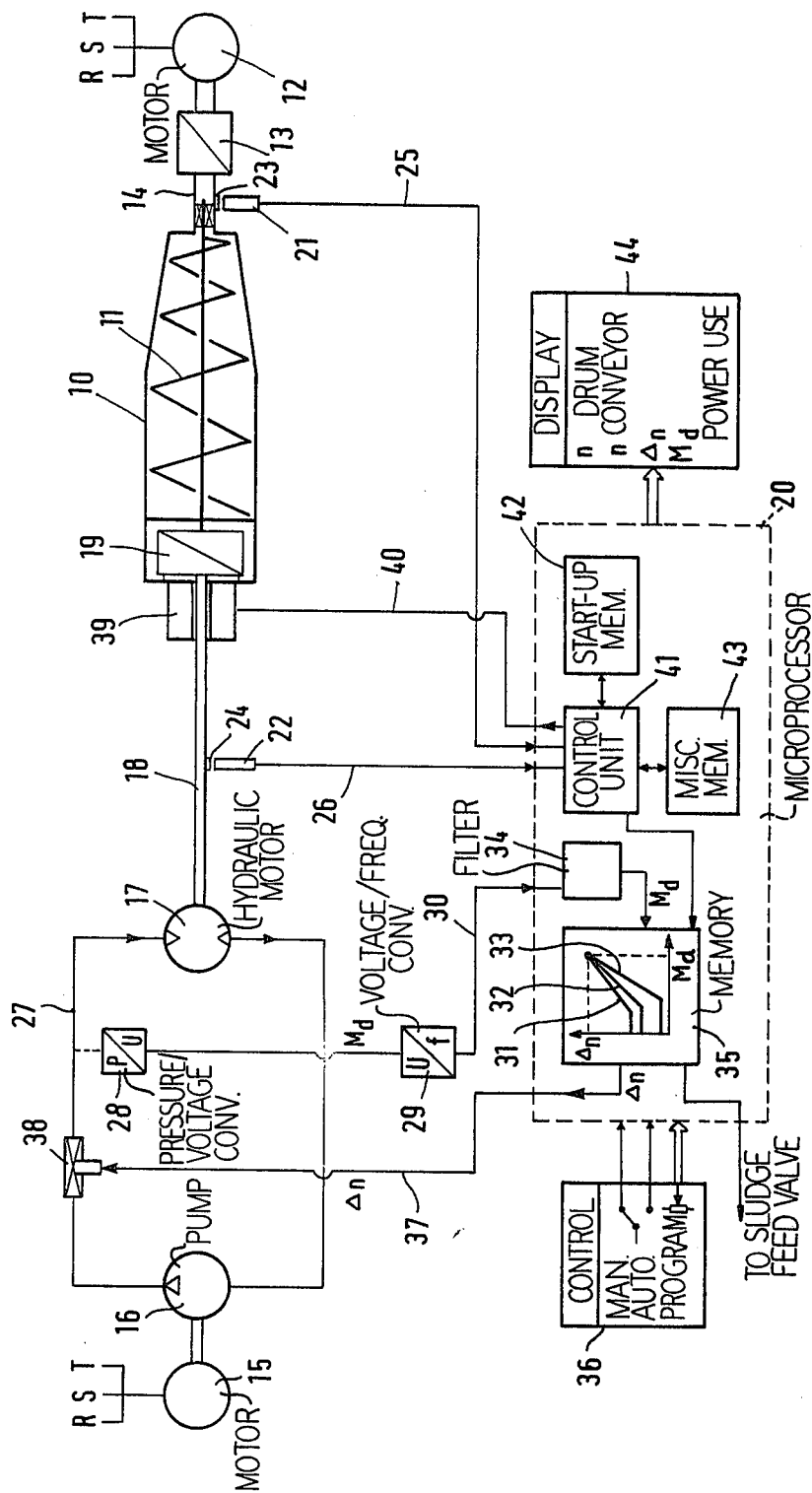

METHOD AND APPARATUS FOR REGULATING THE DIFFERENTIAL RPM OF TWO ROTATING PARTS

BACKGROUND OF THE INVENTION

The present invention relates to a method and apparatus for controlling and regulating the differential rotations per minute (rpm) of two structural parts each rotating at a different speed, and in particular to such a method and apparatus for regulating the differential rpm between a centrifuge jacket or drum and the worm conveyor in a worm centrifuge.

Many devices employ rotating parts which require a relatively precise differential in the rotational speeds of the parts be maintained for proper operation. One such device is a worm centrifuge which is employed for de-watering relatively thin sludges and other solids-liquid mixtures which have a relatively low solid matter content, as well as for de-watering thick sludges which have a high solid matter content. A full sleeve worm centrifuge, as a rule, has a rotating external centrifuge cylinder or drum which has a cylindrical portion followed by a tapering conical portion in the direction of material flow through the centrifuge. The drum houses an internal worm conveyor having a cross-sectional contour corresponding to the shape of the drum and which rotates within the drum. The drum is also rotated, by a separate drive means, and the worm conveyor may be rotated therein in leading or lagging relation to the cylinder rotation.

The worm conveyor has the function of conveying the solid matter particles which are deposited by the centrifugal force created by rotation on the cylinder wall to solid matter discharge openings disposed at the conical end of the centrifuge cylinder. The deposited solid matter is transferred by the worm conveyor from the liquid pond in the cylindrical portion of the centrifuge to the conical end portion of the cylinder where post-de-watering of the solid matter takes place, before discharge through the discharge openings. In practice, the differential rpm between the worm conveyor and the centrifuge cylinder is generally in the range of 1 to 20 revolutions per minute, and in some cases may be substantially greater. The differential rpm between the conveyor and the cylinder must be selected so as to satisfy two competing needs. First, the differential rpm must be as large as necessary in order to transport the solid matter which is being continuously separated. On the other hand, the differential rpm must be selected at a low enough value so that the solid substances remain as long as possible in the conical section of the drum and become de-watered as much as possible in order to achieve a low residual moisture value in the discharged solid matter to facilitate subsequent disposal. Additionally, the differential rpm must be selected low enough to cause only minimal disturbance to the solid matter sedimentation by turbulence.

Selection of the rpm differential in a worm centrifuge is further complicated by physical limits on the operation of the worm centrifuge which are determined by the centrifuge structure and the type of material to be separated therein. If the differential rpm is selected too low, or becomes too low through unmonitored operation, the possibility of choking or clogging of the conveyor as a result of volume and concentration fluctuations in the feed to the conveyor is substantial. In order to achieve the most efficient use of a worm centrifuge, it is desireable to operate the centrifuge at a differential rpm which is just above a differential rpm at which such choking or clogging will occur. This optimum limit operation can be continuously maintained only by a rapid and precise measurement of the differential rpm between the worm and cylinder followed by immediate regulation of the differential rpm to the value which is necessary for the instantaneous conditions to prevent clogging.

A worm centrifuge is known from U.S. Pat. No. 3,734,399 in which the differential rpm between the conveyor and cylinder is maintained at a constant 16 revolutions per minute. In this known device, the drive torque of the conveyor is measured and, in dependence upon this measured quantity, an automatic adjustment is undertaken to the sludge supply valve. This known type of regulation functions to obtain a uniform degree of admission or charge of solids-liquid mixture to the centrifuge cylinder and is a form of overload protection for the conveyor drive.

It is an object of the present invention to provide a method and apparatus for regulating the differential rpm of two rotating parts in a device so as to continuously operate the device at a differential rpm which insures the most economic use of the device.

It is a further object of the present invention to provide a method and apparatus for regulating the differential rpm between the rotating drum and conveyor in a worm centrifuge such that the worm conveyor is operated at a speed so as to just barely avoid choking by the solid matter. It is a further object of the present invention to provide such a method and apparatus in a worm centrifuge in which the differential rpm can be selected so as to adapt to specific load conditions.

The above objects are inventively achieved in the context of a worm centrifuge by a method and apparatus which undertakes electronic measurement of the rpm of the centrifuge drum and of the worm conveyor, as well as measuring the torque of the worm conveyor, and which calculates the actual differential rpm in a microprocessor and compares the resulting differential to an optimum value and which undertakes a regulatory correction of the rotational speed of the worm conveyor in the event that the calculated value deviates from the optimum value.

In accordance with the principles of the present invention, the differential rpm is not determined by direct measurement, but rather is calculated very rapidly and very precisely by electronic means connected to a microprocessor. In very brief time intervals of, for example, 300 $\mu$sec, pulses emitted by the rotating cylinder as well as pulses emitted by the rotating worm conveyor are sampled by the microprocessor, the result of the samplings between two or more received pulses is counted, and a quotient calculation is undertaken to determine the respective rpm of each rotating part. The differential rpm with respect to the two rotating parts is then calculated by the microprocessor by subtraction. As an additional input quantity, the drive torque of the worm conveyor is measured and this information is supplied to the microprocessor. Different characteristic curves may be stored in the microprocessor representing optimum values for different sludge types and different sludge consistencies which are to be de-watered, on the basis of which an optimum differential rpm is determined for selecting the appropriate drive torque for the worm conveyor. Upon deviation of the actual value, calculated from the differential rpm, from the nominal or optimum value stored in the microprocessor, determined by the worm torque and the characteristic curve, a regulatory intervention is undertaken to the drive of the conveyor worm so as to adjust the rpm of the conveyor worm to correct the differential rpm in such a manner that the centrifuge will not become clogged with solid matter, while still permitting the solid matter to be transported as slowly as possible so that optimum de-watering takes place just below the limit operation of the worm centrifuge.

Other objects and features and advantages of the present invention will be apparent from the following detailed description together with the sample embodiment shown in the drawing.

DESCRIPTION OF THE DRAWING

The single drawing is a schematic diagram of a worm conveyor and a method and apparatus connected thereto for regulating the differential rpm of the drum and conveyor thereof constructed in accordance with the principles of the present invention.

DESCRIPTION OF THE PREFERRED EMBODIMENTS

A worm centrifuge is shown in the drawing having a separately rotatable drum or jacket 10 and a worm conveyor 11 rotatably disposed therein. The drum 10 and the exterior contour of the conveyor 11 exhibit, in longitudinal cross-section, a generally cylindrical portion followed by a tapering conical portion in the direction of transfer of material through the centrifuge. The separated solid matter is discharged through discharge openings (not shown) disposed at a downstream end of the conical portion. The drum 10 is driven by a motor 12 via a belt drive schematically shown at 13 and a shaft 14. The conveyor 11 is driven by a motor 15 through a hydraulic pump 16, a hydraulic motor 17, a shaft 18 and a gear 19. The drum 10 rotates at, for example, 700 to 1400 rpm at a rotational speed which is maintained constant, whereas the worm conveyor 11 leads the rotation of the drum 10 with a differential rotational speed of, for example, 1 to 20. The direct measurement of such a small differential rpm would be very imprecise when undertaken by conventional measuring methods resulting in a large relative error. In accordance with the principles of the present invention, the measured quantity of the differential rpm is formed with the aid of a microprocessor 20 which precisely determines the respective rpm of the worm conveyor 11 and the drum 10 and calculates the difference.

In order to detect the rotational speed of the rotating parts, measured value transmitters or pick-ups 21 and 22 are respectively disposed in spaced relation to the shafts 14 and 18. The shaft 14 carries an initiator 23 and the shaft 18 carries an initiator 24, which are respectively disposed to pass through the field of view of the pick-ups 21 and 22 as the shafts rotate. It is also possible to mount the initiators on the belt pulleys or on other co-rotating structural parts. The pick-ups 21 and 22 may, for example, be inductive generators for producing a pulse upon each passage of the initiators 23 and 24 through the field of view, in which case the initiators 23 and 24 are iron cams. The passage of the cams 23 and 24 within the field of view of the pick-ups 21 and 22 changes the magnetic field generated thereby, causing a pulse to be generated. Such generators are known to those skilled in the art and need not be further described herein.

The outputs of the pick-ups 21 and 22 are respectively supplied to the microprocessor 20 via signal lines 25 and 26. In a very brief time interval such as, for example, approximately 300 μsec, the outputs of the pick-ups 21 and 22 are sampled, whereby the rpm of the respective rotating structural part is inversely proportional to the number of sampling between two or more pulses emitted by the rotating part.

The rpm determination by the microprocessor 20 is substantially more rapid and more precise than known rpm measurement by means of tacho-generators which, in contrast to the inventive measurement method and apparatus disclosed herein, are not inertia-free and which, moreover, require a free shaft end for connection to the drive of the tacho-generator. Additionally, the precision of the determination of the differential rpm by means of tacho-generators is dependent upon the measurement range, unlike the present apparatus.

As a third input quantity or variable, the drive torque of the worm conveyor 11 is also supplied to the microprocessor 20. In the case of a hydraulic drive as shown in the sample embodiment, the drive torque of the worm 11 is proportional to the pressure of the hydraulic fluid upstream of the hydraulic motor 17. A pressure measuring device 28 is connected to the hydraulic circulation line 27 at which point the hydraulic fluid is flowing toward the motor 17. The pressure measuring device 28 includes a transducer for converting the measured pressure value into a corresponding voltage, which is in turn transformed by a voltage-frequency converter 29 into a corresponding frequency. Three frequencies are thus supplied as input variables to the microprocessor 20 on three lines 25, 26 and 30. In the microprocessor 20, different characteristic curves can be stored which represent different sludge types and sludge consistencies to be de-watered for controlling the drive torque of the worm conveyor 11 so as to permit operation with a minimum differential rpm at which the conveyor worm 11 is driven so as to barely avoid clogging, as described in greater detail below.

For achieving such operation, three exemplary characteristic curves 31, 32 and 33 are schematically shown as being contained in a memory 35. The curves represent a plot of the differential rpm $\Delta_n$ on the ordinate and the drive torque $M_d$ of the worm conveyor 11 on the abscissa. A filter 34 is disposed between the line 30 and the memory 35 which derives a torque value $M_d$ from the frequency supplied by the line 30. A control console is schematically shown at 36 by which the system can be operated manually or automatically and by which the characteristic curves 31, 32 and 33 can be entered and stored in the memory 35.

Upon deviation of the actual value, determined from the differential rpm, from the optimum value, determined by the conveyor torque and the characteristic curve, a correction is undertaken to the drive of the conveyor 11 for returning the differential rpm to the optimum value. This control intervention is represented in the drawing by an output line 37 from the microprocessor 20 which is connected to a servo valve 38 which performs the function of adjusting the flow of hydraulic fluid in the line 27 by increased or decreased volume as needed so as to increase or decrease the rotational speed of the hydraulic motor 16 and accordingly vary the rotational speed of the worm conveyor 11. The worm centrifuge is thus automatically continuously driven so that the coordinate point formed from the worm torque and the differential rpm always lies on the particular optimum characteristic curve is use. The correction of the differential rpm proceeds very rapidly and very precisely because after only one revolution of the drum shaft 14 or the conveyor shaft 18, the differential rpm is recalculated and a regulatory correction on the conveyor rpm can be conducted. The inventive system disclosed herein can be further employed with the sludge feed valve (not shown) so that when the maximally possible differential rpm is reached, and thus the limits of regulation by the inventive control apparatus are reached, the microprocessor 20 can be used to control the sludge feed valve so as to directly regulate the quantity of material supplied to the centrifuge so as to serve as a back-up against choking and clogging.

To start the worm centrifuge, the centrifuge drum 10 may be driven by the hydraulic drive of the worm conveyor 11 via a suitable coupling 39, such as, for example, an electromagnetic coupling, which, upon attainment of a selected operating rpm, is automatically decoupled and the cylinder drive motor 12 is switched on and the sludge feed valve is opened. The signals for coupling and decoupling the coupling 39 are supplied by the microprocessor 20 on a line 40. The lines 25 and 26 serve as inputs and the line 40 serves as an output for a control unit 41 within the microprocessor 20 which is supplied with a suitable start-up program stored in a memory 42 and may be supplied with other operational programs stored in a miscellaneous memory 43.

A display 44 is connected to the microprocessor 20 for visual display of the drum rpm, the conveyor rpm, the differential rpm, the conveyor torque and the power consumption of both drive motors, as well as additional measured quantities as may be undertaken. The mean value may be calculated by additional measurements and also displayed.

It will be understood by those skilled in the art that more than three events represented by electronic signals may be monitored and processed by the microprocessor 20 as may be necessary to effect a further refinement of controlled operation of the centrifuge.

Other modifications and changes may be suggested by those skilled in the art however it is the intention of the inventors to embody within the patent warranted hereon all changes and modifications as reasonably and properly come within the scope of their contribution to the art.

We claim as our invention:

1. A method for regulating the differential rpm of a centrifuge drum and an internally disposed worm conveyor in a worm centrifuge, said drum and said conveyor rotating at different speeds comprising the steps of:

measuring the individual speeds of said drum and conveyor;

supplying electronic signals corresponding to the measured speeds of said drum and said conveyor to a microprocessor;

generating a pulse train for each of said drum and said conveyor having pulses corresponding to one rotation of said drum and said conveyor;

sampling said pulse train at a frequency greater than the rotational frequency of said drum and said conveyor;

counting the number of samplings between two or more pulses received in said microprocessor;

calculating a quotient corresponding to said number of samplings for each pulse train;

calculating a differential rpm between said drum and said conveyor from the quotients for said pulse trains;

comparing said calculated differential rpm to an optimum rpm value; and supplying a signal to a means for changing the rotational speed of said worm conveyor if said calculated differential rpm deviates from said optimum rpm.

2. The method of claim 1 further comprising the additional step of supplying an electronic signal to said microprocessor representing the drive torque for driving the worm conveyor.

3. The method of claim 2 wherein said worm conveyor is driven by a hydraulic motor and wherein said electronic signal corresponding to said drive torque is derived by measuring the pressure of the hydraulic fluid upstream of said hydraulic motor.

4. The method of claim 3 comprising the additional step of supplying a signal to a regulating valve disposed upstream of said hydraulic motor for adjusting the volume of hydraulic fluid to said motor upon deviation of said actual rpm differential from said optimum rpm differential.

5. The method of claim 1 further comprising the step of supplying a signal to a sludge feed valve upon achieving a maximum rpm differential for regulating the supply of material to said worm centrifuge intake.

6. An apparatus for regulating the differential rpm of a drum and internally disposed worm conveyor in a worm centrifuge comprising:

a microprocessor;

a means associated with each of said drum and said conveyor for generating an electronic signal consisting of a pulse train corresponding to the rotational speed thereof, each of said means supplying said signal to said microprocessor;

a means for transmitting an electronic signal to said microprocessor corresponding to the drive torque for driving said worm conveyor;

a sampling means in said microprocessor for sampling said pulse trains at a frequency greater than the rotational frequency of said drum and said conveyor;

a counter means in said microprocessor for counting the number of samples between two or more pulses received in said microprocessor;

a means in said microprocessor for calculating a quotient for each pulse train corresponding to said number of samples;

a means in said microprocessor for storing an optimum rpm differential value for different drive torques for said worm conveyor, said microprocessor comparing said signals with said optimum value for determining a deviation therefrom; and a means associated with a drive means for driving said worm conveyor connected to said microprocessor for receiving a signal therefrom to vary said drive torque upon deviation of said signals from said optimum value for equalizing said signals to said optimum value.

7. The apparatus of claim 6 wherein said means for driving said worm conveyor is a hydraulic motor operated by a pump and wherein said means for varying said drive torque is a valve interconnected between said pump and an input side of said hydraulic motor for vaying the volume of hydraulic fluid supplied thereto.

8. A method for regulating the differential rpm of a centrifuge drum and an internally disposed worm conveyor in a worm centrifuge, said drum and said conveyor rotating at different speeds comprising the steps of:

measuring the individual speeds of said drum and conveyor;

supplying electronic signals corresponding to the measured speeds of said drum and said conveyor to a microprocessor;

calculating the individual speeds of said drum and conveyor in said microprocessor and calculating a differential rpm therefrom;

storing a plurality of different characteristic curves in said microprocessor, said curves representing an optimum rpm differential for different drive torques for driving said worm conveyor for different sludge types and consistencies;

comparing said calculated differential rpm to an optimum rpm differential represented by one of said characteristic curves; and supplying a signal to a means for changing the rotational speed of said worm conveyor if said calculated differential rpm deviates from said optimum rpm represented by said one of said characteristic curves.

9. A method for regulating the differential rpm of a centrifuge drum and an internally disposed worm conveyor in a worm centrifuge, said centrifuge having a releaseable coupling interconnected between said drum and said conveyor for selective corotation of said drum and said conveyor, said drum and said conveyor rotating at different speeds, said method comprising the steps of:

measuring the individual speeds of said drum and conveyor;

supplying electronic signals corresponding to the measured speeds of said drum and said conveyor to a microprocessor;

supplying a signal from said microprocessor to said coupling during start-up of said centrifuge for driving said drum by the same drive means for driving said conveyor;

monitoring the rpm of said corotating drum and conveyor in said microprocessor;

supplying a signal to said coupling from said microprocessor for automatically uncoupling said coupling upon attainment of a predetermined rpm;

switching on a separate drive means for separately driving said drum;

opening a sludge feed valve to said centrifuge for supplying material to be separated and de-watered thereto;

calculating the individual speeds of said drum and said conveyor in said microprocessor and calculating a differential rpm therefrom;

comparing said calculated differential rpm to an optimum rpm value; and supplying a signal to a means for changing the rotational speed of said worm conveyor if said calculated differential rpm deviates from said optimum rpm.

* * * * *